United States Patent
Bornoff et al.

(10) Patent No.: US 8,628,236 B2
(45) Date of Patent: Jan. 14, 2014

(54) THERMAL ANALYSIS

(75) Inventors: Robin Bornoff, Ross-on-Wye (GB);
John David Parry, Surbiton (GB);
Byron Blackmore, Dartmouth (CA);
Alan Davies, Chertsey (GB)

(73) Assignee: Mentor Graphics Corporation, Wilsonville, OR (US)

( * ) Notice: Subject to any disclaimer, the term of this patent is extended or adjusted under 35 U.S.C. 154(b) by 213 days.

(21) Appl. No.: 13/091,867

(22) Filed: Apr. 21, 2011

(65) Prior Publication Data

US 2011/0268147 A1  Nov. 3, 2011

Related U.S. Application Data

(60) Provisional application No. 61/275,708, filed on May 2, 2010, provisional application No. 61/433,507, filed on Jan. 17, 2011.

(51) Int. Cl.
*G01K 17/00* (2006.01)
*G01K 3/00* (2006.01)

(52) U.S. Cl.
USPC ............... 374/29; 374/137; 374/112; 374/30

(58) Field of Classification Search
USPC ..................... 374/29, 137, 112, 30
See application file for complete search history.

(56) References Cited

U.S. PATENT DOCUMENTS

| | | | | |
|---|---|---|---|---|
| 3,344,669 | A * | 10/1967 | Roedder | 374/112 |
| 5,321,612 | A * | 6/1994 | Stewart | 702/13 |
| 6,076,964 | A * | 6/2000 | Wu et al. | 374/141 |
| 7,406,644 | B2 * | 7/2008 | Kaushal et al. | 714/733 |
| 7,526,699 | B2 * | 4/2009 | Kaushal et al. | 714/733 |
| 7,848,902 | B2 * | 12/2010 | Zettel et al. | 702/136 |
| 8,155,933 | B2 * | 4/2012 | Yilbas et al. | 703/2 |
| 2006/0013281 | A1 * | 1/2006 | Sri-Jayantha et al. | 374/163 |
| 2008/0082288 | A1 * | 4/2008 | Raad | 702/130 |
| 2012/0209559 | A1 * | 8/2012 | Brower | 702/130 |

OTHER PUBLICATIONS

Ansys Commands Reference Ansys Release 7.1 May 2003 12 pages (including cover and title page) Ansys, Inc.

* cited by examiner

*Primary Examiner* — Mirellys Jagan

(57) ABSTRACT

Techniques for determining one or more heat transfer characteristic values of a structure, such as an electronic device, are disclosed. A heat flux vector magnitude and a temperature gradient vector magnitude for a portion of the structure are determined, and a product of the heat flux vector magnitude with the temperature gradient vector magnitude is obtained. More particularly, the dot product of the heat flux vector magnitude with the temperature gradient vector magnitude may be obtained to provide a bottleneck heat transfer characteristic value. Alternately or additionally, a cross product (or related operation) of the heat flux vector magnitude with the temperature gradient vector magnitude is obtained to produce a shortcut heat transfer characteristic value.

27 Claims, 6 Drawing Sheets

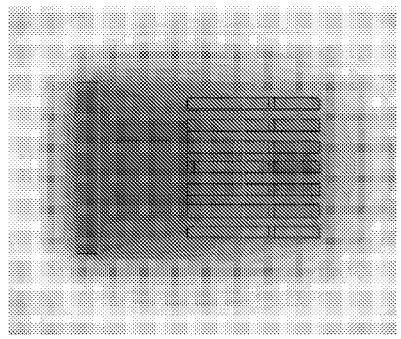 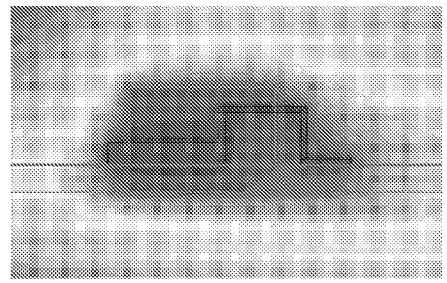
FIGURE 4A FIGURE 4B
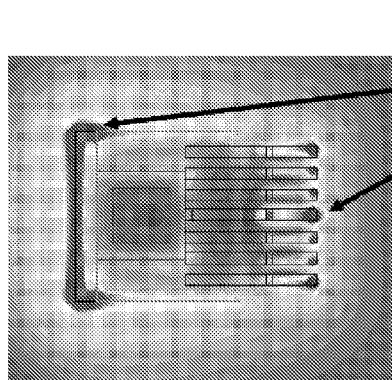 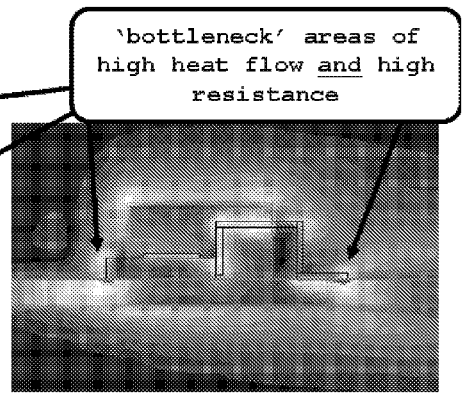
FIGURE 5A FIGURE 5B

THERMAL ANALYSIS

RELATED APPLICATIONS

This application claims priority to U.S. Provisional Patent Application No. 61/275,708, entitled "Thermal Analysis," filed on May 2, 2010, and naming Robin Bornoff et al. as inventors, and U.S. Provisional Patent Application No. 61/433,507, entitled "Thermal Analysis," filed on Jan. 17, 2011, and naming Robin Bornoff et al. as inventors, both of which applications are incorporated entirely herein by reference.

FIELD OF THE INVENTION

The present invention is directed to the thermal analysis of various structures. Various aspects of the invention may be particularly useful for identifying heat flow issues in electronic devices, such as integrated microcircuits and circuit boards, so that these devices can be modified to their improve heat flow.

BACKGROUND OF THE INVENTION

Heat flow problems and the resulting higher temperatures is a reoccurring concern in a wide variety of technologies. Excessive heat can damage spacecraft on takeoff or reentry, cause combustion engines to seize up, lead to meltdowns in nuclear reactors, and increase cooling costs in buildings. Heat flow is a particular issue for electronic devices. Too much heat can degrade or destroy a range of electronic devices, including integrated microcircuits, larger circuits on printed circuit boards, electronic storage devices, and lasers. As the size of electronic devices such as integrated microcircuits continues to be reduced, the surface area available to channel excessive heat from these devices is reduced as well. Accordingly, heat flow considerations can be a major issue in designing new products, and particularly in designing electronic devices.

A number of tools have been developed to analyze heat flow in devices. Infrared camera and thermal sensors have been used, for example, to observer and record heat information from physical structures. Computer modeling tools have been used to predict and simulate the flow of heat of both physical and virtual structures. Integrated circuit manufacturers, for example, may employ computer modeling software to predict heat flow for a new circuit from the design of that circuit, before it has even been manufactured.

While these tools have been useful in revealing heat flow in various devices, they typically provide no guidance as to how a device can be modified to change its heat flow. Instead, a user, such as a product designer, usually must rely on his or her personal experience or broad design guidelines to determine how the heat flow of a device can be improved. As a result, many product designers may overlook more efficient device modifications for improving heat flow, and instead employ less effective, more bulky, and/or more expensive techniques to reduce temperature in a device.

BRIEF SUMMARY OF THE INVENTION

Aspects of the invention relate to techniques for determining one or more heat transfer characteristic values of a structure, such as an electronic device. Various embodiments of the invention will determine a heat flux vector magnitude for a portion of the structure, a temperature gradient vector magnitude for the portion of the structure, and a product of the heat flux vector magnitude with the temperature gradient vector magnitude. Some implementations of the invention may determine the dot product of the heat flux vector magnitude with the temperature gradient vector magnitude, to obtain a bottleneck heat transfer characteristic value. As used herein, a thermal "bottleneck" refers to a region or path of a structure where, if additional heat could be channeled through that region, it would be beneficial to do so. As will be discussed in more detail below, relatively higher bottleneck heat transfer characteristic values indicate regions of a structure where heat flow is more restricted than other regions of the structure regions (i.e., regions or paths having a significant amount of heat flow but experiencing higher thermal resistance to that heat flow than other regions or paths). Other implementations of the invention may alternately or additionally determine a cross product of the heat flux vector magnitude with the temperature gradient vector magnitude to obtain a shortcut heat transfer characteristic value. As used herein, a thermal "shortcut" refers to a region or path through which substantially more heat could be conducted (i.e., a region or path where a heat flow path may be added, so as to cause the heat flow to bypass (or reduce the heat flow through) other regions or paths of relatively higher thermal resistance). As also will be discussed in more detail below, relatively higher shortcut heat transfer characteristic values indicate alternate or additional regions of a structure where additional heat conduction will improve overall heat flow.

The ability to determine where thermal bottlenecks exist in a structure enables a designer to make better informed thermal design decisions. For example, if a user was considering modifying a structure to make a single reduction in thermal resistance, relatively higher bottleneck heat transfer characteristic values would indicate where best to make the modifications so as to maximize the reduction in temperature of the structure. Similarly, the ability to determine where there are shortcut opportunities to insert new heat transfer paths in a structure enable a user to make better informed thermal design decisions. For example, if a user was considering where to add a single new object to a structure, relatively higher shortcut heat transfer characteristic values would indicate where best to place the new object so as to shortcut the heat flow to cooler areas, thus reducing the temperatures in the structure.

With various implementations of the invention, the heat transfer characteristic values of a structure may be displayed to a user, stored for future use, or both. If the structure is a physical device, a user may employ the heat transfer characteristic values to modify the structure so as to improve its heat flow. A user may, for example, attach a cooling device (e.g., a cooling fin) to a specific portion of the structure, add a material with greater heat conductivity to the structure to a specific portion of the structure, or modify the shape of a specific portion of the structure (e.g., drilling holes in the structure).

If the structure is a virtual structure, such as a circuit design, the heat transfer characteristic values may be used to modify the design of the structure to improve heat flow. For example, with some implementations of the invention, a user may employ heat transfer characteristic values to manually modify the design. With still other implementations of the invention, a design tool may alternately or additionally modify a design based upon heat transfer characteristic values with minimal or no human intervention.

These and other features of the invention will be described in more detail below.

BRIEF DESCRIPTION OF THE DRAWINGS

FIGS. 4A and 4B illustrate a graph of modeled temperature values for a circuit device.

FIGS. 5A and 5B illustrate a graph of bottleneck heat transfer characteristic values for the circuit device shown in FIGS. 4A and 4B that may be provided according to various embodiments of the invention.

DETAILED DESCRIPTION OF THE INVENTION

Exemplary Operating Environment

Figure 1:
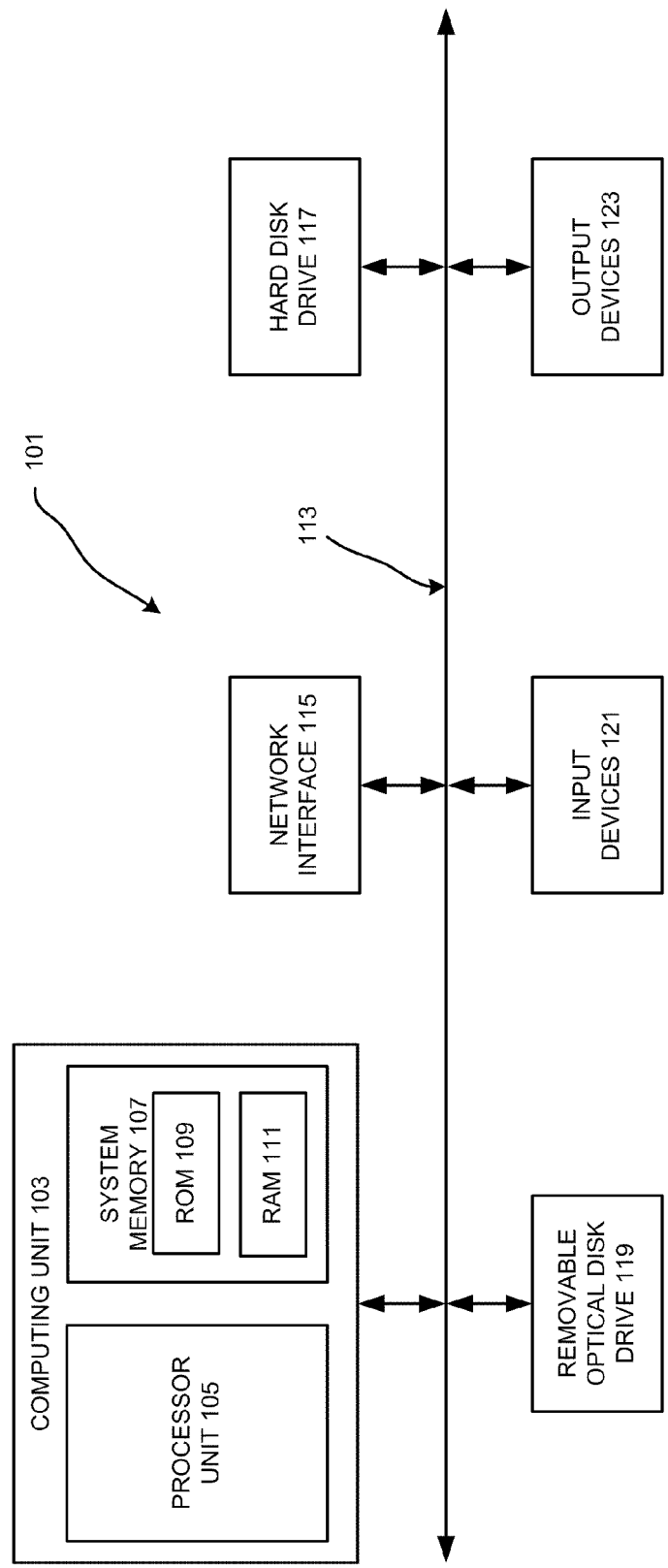
FIG. 1 illustrates an example of a programmable computer that may be used to implement a thermal analysis tool or method according to various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Thermal Analysis Tool

Figure 2:
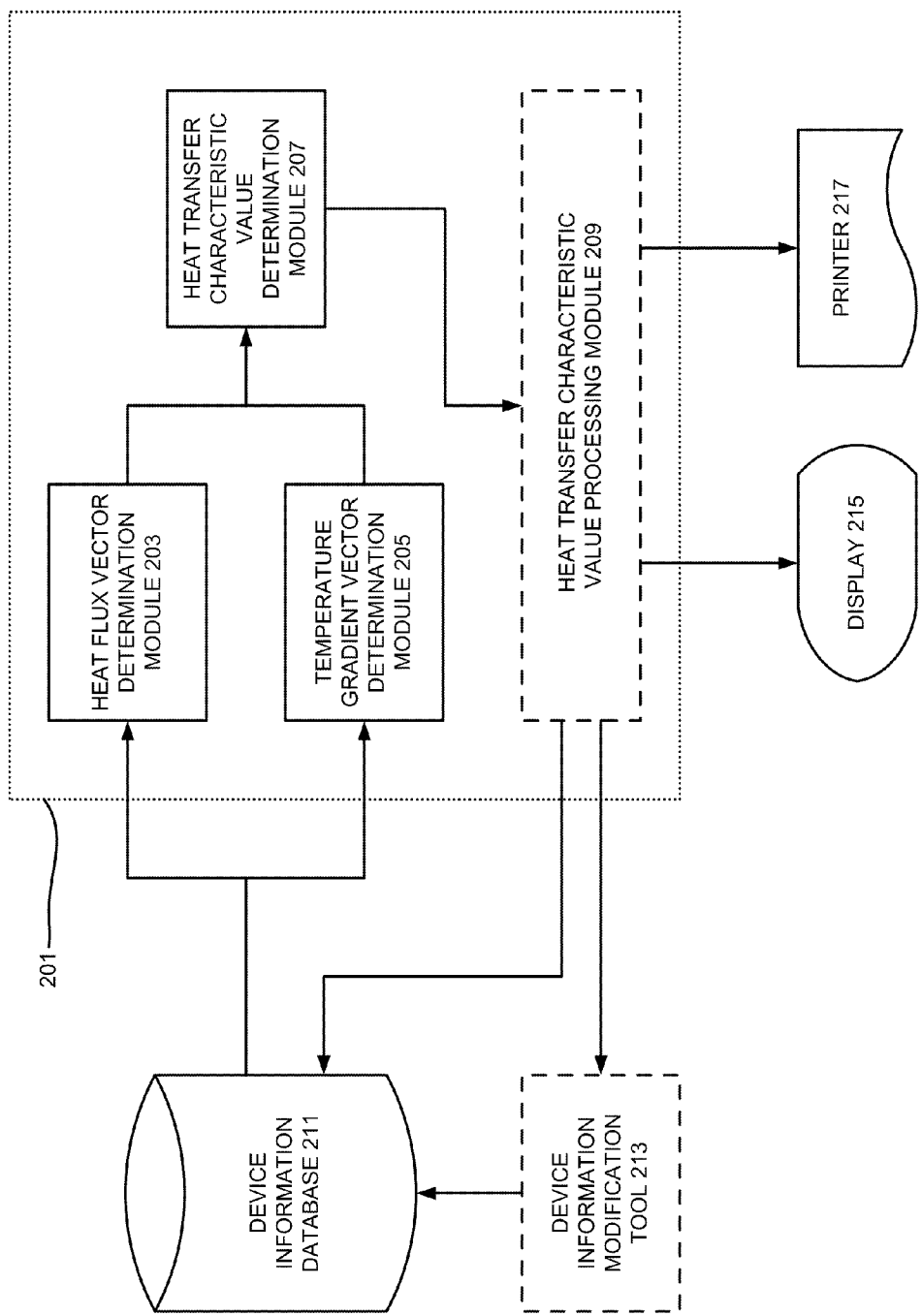
FIG. 2 illustrates a thermal analysis tool or method according to various embodiments of the invention.

FIG. 2 illustrates an example of a thermal analysis tool that may be provided according to various embodiments of the invention. As seen in this figure, the thermal analysis tool 201 includes a heat flux vector determination module 203, a temperature gradient vector determination module 205, and a heat transfer characteristic value determination module 207. Some implementations of the thermal analysis tool 201 may optionally include a heat transfer characteristic value processing module 209. As will be discussed in more detail below, some implementations of the thermal analysis tool 201 may be employed with a device information database 211, a device information modification tool 213, a display 215, a printer 217, or some combination thereof.

With some embodiments of the invention, one or more of the heat flux vector determination module 203, temperature gradient vector determination module 205, the heat transfer characteristic value determination module 207, and the heat transfer characteristic value processing module 209 may be implemented by one or more programmable computers, such as the computer 101 shown in FIG. 1, executing programming instructions. Correspondingly, alternate embodiments of the invention may be implemented by software instructions for programming a programmable computer to perform the functions of one or more of the modules 203-209 stored on a computer-readable medium. The computer-readable medium may be, for example, a magnetic storage device, an optical storage device, a "punched" surface type device, or a solid state storage device.

As will be discussed in more detail below, the heat flux vector determination module 203 is configured to obtain the heat flux vector of a portion of a structure, such as an electronic device. Similarly, the temperature gradient vector determination module 205 is configured to obtain the temperature gradient vector of a portion of a structure. With some implementations, the heat flux vector determination module 203, the temperature gradient vector determination module 205, or both may passively receive their respective vector information from an outside source, such as a database or other thermal analysis tool. With still other implementations, however, the heat flux vector determination module 203, the temperature gradient vector determination module 205, or both may be configured to calculate their respective vector information from raw data.

For example, if the thermal analysis tool 201 is being used to analyze a physical structure, then the heat flux vector determination module 203, the temperature gradient vector determination module 205, or both may determine their respective vector information by applying computer modeling algorithms to thermal measurements of the structure. The thermal measurements may be, e.g., surface temperatures obtained by a thermal imaging camera and heat flux values obtained by heat flux sensors mounted on the structure. Alternately, if the thermal analysis tool 201 is being used to analyze a virtual structure (e.g., an electronic device design), then the heat flux vector determination module 203, the temperature gradient vector determination module 205, or both may determine their respective vector information by applying computer modeling algorithms to design data describing the structure. Where the vector information is not provided, various implementations of the invention may use conventional thermal modeling software to determine the vector information from thermal measurements or design data. For example, if the structure is a virtual description of an electronic device, various examples of the invention may employ the Flo-THERM® family of software products available from Mentor Graphics Corporation of Wilsonville, Oreg., the FloEFD® family of software products available from Mentor Graphics Corporation of Wilsonville, Oreg., or the ANSYS® Icepak® software product available from Ansys, Inc., of Canonsburg, Pa., to implement the heat flux vector determination module 203, the temperature gradient vector determination module 205, or both. As will be appreciated by those of ordinary skill in the art, As will also be discussed in more detail below, the heat transfer characteristic value determination module 207 is configured to determine a product of the heat flux vector magnitude with the temperature gradient vector magnitude. With some implementations of the invention, the heat transfer characteristic value determination module 207 may obtain a cross product of the heat flux vector magnitude with the temperature gradient vector magnitude, a dot product of the heat flux vector magnitude with the temperature gradient vector magnitude, or both. The optional heat transfer characteristic value processing module 209 may then be configured to convert the products of the vectors into more convenient forms of heat transfer characteristic values. The heat transfer characteristic value processing module 209 may, for example, determine the absolute value of the vector products, normalize the vector products, or both.

As previously noted, some implementations of the invention may be employed with a device information database 211, an optional device information modification tool 213, a display 215, and/or a printer 217. For example, if the thermal analysis tool 201 is being used to analyze a design of a virtual electronic device, the device design information may be stored on and retrieved from the device information database 211. Also, if the heat transfer characteristic values are saved for future use, they may be stored in the device information database 211. Similarly, if the thermal analysis tool 201 is being used to analyze a design of a virtual electronic device, the device information modification tool 213 may optionally be used to automatically modify the design data based upon heat transfer characteristic values provided by the thermal analysis tool 201. With some implementations of the invention, the heat transfer characteristic values may alternately or additionally be displayed to a user on a display 215 or a printer 217. The display 215 may be any conventional display, such as a CRT or LCD flat screen display. As will be appreciated by those of ordinary skill in the art, any conventional rendering software program may be used to render the heat transfer characteristic values on the display 215.

Determination of a Heat Transfer Characteristic Value

Figure 3A:
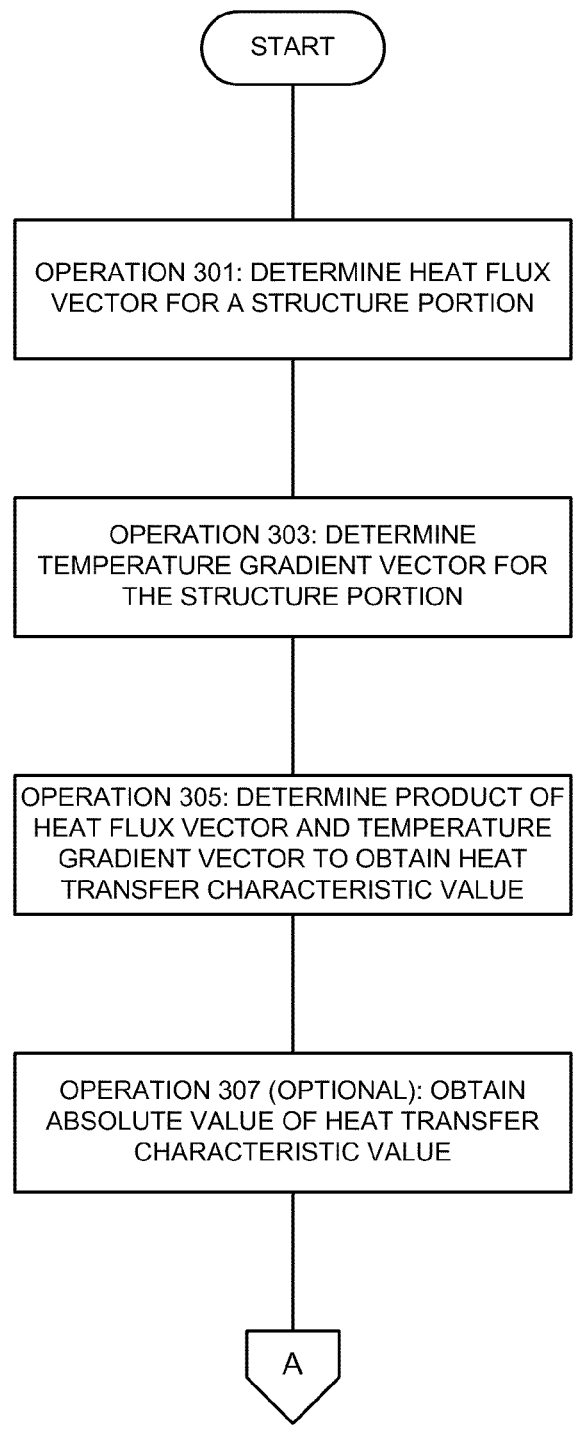
FIGS. 3A and 3B illustrate a flowchart showing methods of determining heat transfer characteristic values according to various embodiments of the invention.
Figure 3B:
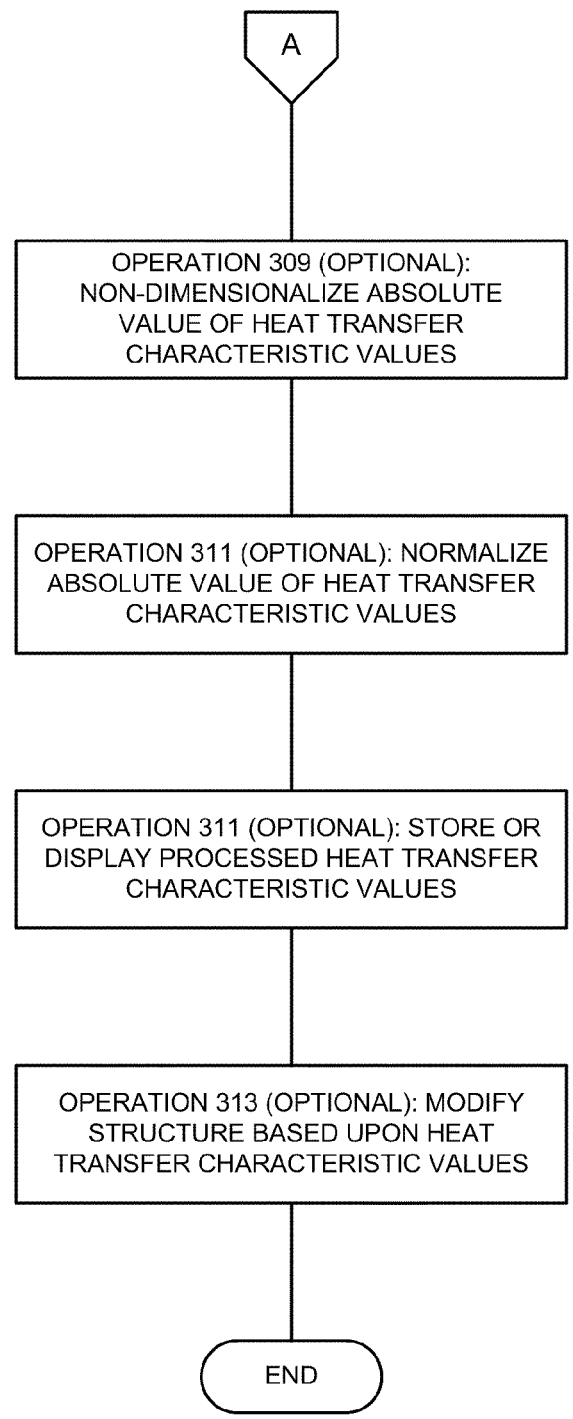

FIGS. 3A and 3B illustrate thermal analysis methods that may be employed according to various embodiments of the invention. For ease of understanding, these methods will be described with reference to the thermal analysis tool 201 illustrated in FIG. 2. It should be appreciated, however, that alternate implementations of a thermal analysis tool may be used to perform the thermal analysis methods shown in FIGS. 3A and 3B. Likewise, the thermal analysis tool 201 may be employed to perform other thermal analysis methods according to various embodiments of the invention.

Initially, in operation 301, the heat flux vector determination module 203 determines a heat flux vector for a portion of the structure being analyzed. The portion may be, for example, a specified location in or on the structure, or a region of the structure. As will be appreciated by those of ordinary skill in the art, heat flux is defined in terms of heat (i.e., energy) flow through a given cross section of area. Accordingly, the heat flux vector determination module 203 may determine a heat flux vector with units of $W/m^2$ (i.e., watts per meter-squared). Because heat flow has both a magnitude and a direction, it is expressed as a vector value. As previously noted, with some implementations of the invention, the heat flux vector determination module 203 may simply obtain a predetermined heat flux vector from an outside source. With still other implementations of the invention, however, the heat flux vector determination module 203 may calculate the heat flux vector. If the structure being analyzed is a physical structure, then the heat flux vector determination module 203 may calculate the heat flux vector from thermal measurements of the structure. If the structure being analyzed is a virtual structure, such as a design describing an electronic device, then the heat flux vector determination module 203 may calculate the heat flux vector from the design data. As previously noted, conventional thermal modeling software, such as the Flo-THERM® family of software products available from Mentor Graphics Corporation of Wilsonville, Oreg., the FloEFD® family of software products available from Mentor Graphics Corporation of Wilsonville, Oreg., or the ANSYS® Icepak® software product available from Ansys, Inc., of Canonsburg, Pa., may be used to calculate the heat flux vector.

Next, in operation 303, the temperature gradient vector determination module 205 determines a temperature gradient vector for the portion of the structure. As will be appreciated by those of ordinary skill in the art, the temperature gradient is defined in terms of temperature change per length of distance. Accordingly, the temperature gradient vector determination module 205 may determine a temperature gradient vector with units of deg C/m (i.e., degrees (in Celsius) per meter). Because temperature gradient has both a magnitude and a direction, it is expressed as a vector value. As previously noted, with some implementations of the invention, the temperature gradient vector determination module 205 may simply obtain a predetermined temperature gradient vector from an outside source. With still other implementations of the invention, however, the temperature gradient vector determination module 205 may calculate the temperature gradient vector. If the structure being analyzed is a physical structure, then the temperature gradient vector determination module 205 may calculate the temperature gradient vector from thermal measurements of the structure. If the structure being analyzed is a virtual structure, such as a design describing an electronic device, then the temperature gradient vector determination module 205 may calculate the temperature gradient vector from the design data. As previously noted, conventional thermal modeling software, such as the FloTHERM® family of software products available from Mentor Graphics Corporation of Wilsonville, Oreg., the FloEFD® family of software products available from Mentor Graphics Corporation of Wilsonville, Oreg., or the ANSYS® Icepak® software product available from Ansys, Inc., of Canonsburg, Pa., may be used to calculate the temperature gradient vector, a heat flux vector, or both. Of course, it will be appreciated that still other computer-aided engineering design tools that manipulate recorded and/or modeled thermal information may be used to implement the temperature gradient vector determination module 203, the heat flux vector determination module 205, or both. For example, various computer-aided engineering design tools that employ, e.g., finite difference algorithms, finite volume algorithms, and/or finite element algorithms can be used to model thermal information for a structure, and then determine the temperature gradient vector, a heat flux vector, or both from the thermal information provided from the modeling.

In operation 303, the heat transfer characteristic value determination module 207 determines a heat transfer characteristic value for the portion of the structure based upon its determined heat flux vector and temperature gradient vector. More particularly, the heat transfer characteristic value determination module 207 obtains the product of the heat flux vector with the temperature gradient vector to produce a heat transfer characteristic value for the portion of the structure. With some implementations of the invention, the heat transfer characteristic value determination module 207 may obtain the dot product of the heat flux vector with the temperature gradient vector to produce a bottleneck heat transfer characteristic value. Still other implementations of the invention may obtain the cross product (or an operation related to the cross product) of the heat flux vector with the temperature gradient vector to produce a shortcut heat transfer characteristic value.

As previously noted, to determine a bottleneck heat transfer characteristic value for a portion of a structure, the heat transfer characteristic value determination module 207 will obtain the dot product of the heat flux vector with the temperature gradient vector. As will be appreciated by those of ordinary skill in the art, the dot product of these vectors is obtained by multiplying the magnitude of the heat flux vector by the magnitude of the temperature gradient vector and by the cosine of the angle between the directions of the heat flux vector and the temperature gradient vector. The dot product is typically described by the following formula [1]:

$$a \cdot b = |a||b|\cos\theta \qquad [1]$$

where θ is the measure of the smaller angle between a and b (0°≤θ≤180°), and a and b are the magnitudes of vectors a and b.

The resulting product is a scalar value. With some implementations of the invention, the heat transfer characteristic value determination module 207 will multiply the absolute values of the magnitude of the heat flux vector and the magnitude of the temperature gradient vector with the absolute value of the cosine of the angle between the directions of the heat flux vector and the temperature gradient vector to obtain the dot product. Alternately, the heat transfer characteristic value determination module 207 may simply obtain the absolute value of the resulting scalar value in a later operation. With various implementations of the invention, the units of such a dot product may be, for example, W deg C/m³.

To determine the shortcut heat transfer characteristic value for the portion of the structure, the heat transfer characteristic value determination module 207 obtains the cross product (or a related operation) of the heat flux vector with the temperature gradient vector. As will be appreciated by those of ordinary skill in the art, the cross product of two vectors a×b is defined as a vector c that is perpendicular to both a and b, with a direction given by the right-hand rule and a magnitude equal to the area of the parallelogram that the vectors span. The cross product is typically described by the following formula [2]:

$$a \times b = ab \sin\theta\, n \qquad [1]$$

where θ is the measure of the smaller angle between a and b (0°≤θ≤180°), a and b are the magnitudes of vectors a and b, respectively, and n is a unit vector perpendicular to the plane containing a and b in the direction given by the right-hand rule.

With some embodiments of the invention, the shortcut heat transfer characteristic value will be a scalar value. Accordingly, some implementations of the invention may obtain the true cross product of the heat flux vector with the temperature gradient vector (or the true cross product of temperature gradient vector with the heat flux vector), and then obtain the magnitude (or the absolute value of the magnitude) of the resulting vector as a scalar value. Still other implementations of the invention may obtain the scalar value simply by multiplying the magnitude of the heat flux vector by the magnitude of the temperature gradient vector and the sine of the angle between the directions of the vectors in a "truncated" cross product operation. Accordingly, as used herein, the term "cross product" is intended to include both a true cross product (as defined by the formula [2] above) and the "truncated" cross product described above. With some implementations of the invention, the heat transfer characteristic value determination module 207 will multiply the absolute value of the magnitude of the heat flux vector and the absolute value of the magnitude of the temperature gradient vector with the absolute value of the sine of the angle between the directions of the vectors to obtain the truncated cross product. Alternately, the heat transfer characteristic value determination module 207 may simply obtain the absolute value of the resulting scalar value in a later operation. As with the bottleneck heat transfer characteristic value, the shortcut heat transfer characteristic value may be expressed in units of, for example, W deg C/m³.

Next, in operation 307, the heat transfer characteristic value processing module 209 will obtain the absolute values of the heat transfer characteristic values produced by the heat transfer characteristic value determination module 207. It should be appreciated that this operation is optional for various implementations of the invention, particularly where this operation has already been performed, either inherently or expressly, by the calculations performed by the heat transfer characteristic value determination module 207 as discussed in detail above.

It should be appreciated that operations 301-307 typically will be repeated until the bottleneck heat transfer characteristic values, the shortcut heat transfer characteristic values, or both have been determined for a plurality of portions of the structure, so that heat transfer characteristic values are determined for some or all of the structure. As will be discussed in more detail below, by comparing the bottleneck heat transfer characteristic values for multiple portions of the structure, a user can identify regions of the structure through which, if additional heat could be channeled, it would be beneficial to do so (i.e., the regions having relatively higher bottleneck heat transfer characteristic values). Likewise, by comparing the shortcut heat transfer characteristic values for multiple portions of the structure, a user can identify regions of the structure through which substantially more heat could be conducted if a new heat flow transfer path were added (i.e., those regions having relatively higher shortcut heat transfer characteristic values).

In operation 309, the heat transfer characteristic value processing module 209 may also optionally non-dimensionalize one or both of the heat transfer characteristic values. For example, if the structure is a virtual structure (e.g., an electronic device design), and the heat flux vector and the temperature gradient vector are obtained from using a computerized model of the structure, then the heat transfer characteristic value processing module 209 may non-dimensionalize the bottleneck heat transfer characteristic values, the shortcut heat transfer characteristic values, or both by dividing the heat transfer characteristic values by the total heat source density (which may have units of, e.g., W/m$^3$) defined as an input to the model, and by the total temperature difference exhibited by the model, $T_{max}-T_{min}$, (which may have units of, e.g., deg C) obtained as a result of the simulation. Similarly, if the structure is a physical structure (e.g., an electronic device), and the heat flux vector and the temperature gradient vector are obtained from making thermal measurements of the structure, then the heat transfer characteristic value processing module 209 may non-dimensionalize the bottleneck heat transfer characteristic values, the shortcut heat transfer characteristic values, or both by dividing the heat transfer characteristic values by the total heat source density (which may have units of, e.g., W/m$^3$) measured for the structure, and by the total temperature difference exhibited by the structure, $T_{max}-T_{min}$, (which may have units of, e.g., deg C).

Alternately or additionally, in operation 311 the heat transfer characteristic value processing module 209 may also normalize the bottleneck heat transfer characteristic values, the shortcut heat transfer characteristic values, or both. The bottleneck heat transfer characteristic values may be normalized by dividing these values by the maximum bottleneck heat transfer characteristic value determined for the structure, thus producing a range with a maximum value of one. Similarly, heat transfer characteristic value processing module 209 may alternately or additionally normalize the shortcut heat transfer characteristic values by dividing these values by the maximum shortcut heat transfer characteristic value determined for the structure, thus producing a range with a maximum value of one. Of course still other techniques could be employed to normalize or non-dimensionalize either the bottleneck heat transfer characteristic values, the shortcut heat transfer characteristic values, or both.

Use of a Thermal Characteristic Value

In operation 313, the thermal analysis tool 201 may output the heat transfer characteristics to a data storage device, such as the device information database 211, to the display (or displays) 215, the printer (or printers) 217, or both for viewing by a user, or to some combination of output devices. With some embodiments of the invention, the heat transfer characteristics may be rendered in a two-dimensional or three-dimensional representation of the structure. With these implementations of the invention, the heat transfer characteristics for each portion of the structure may be displayed (or otherwise represented) in the map at a location corresponding to that portion of the structure. For example, the heat transfer characteristic values may be rendered to show their relative magnitudes using, e.g., colors or shading. Of course, still other implementations can use a wide variety of techniques to render the heat transfer characteristic values, including, for example,

- Colored variation on a two-dimensional 'slice' through a 3D model, as shown in FIGS. 5A-6B;
- A two-dimensional 'isosurface' (i.e., a two-dimensional surface rendered in a three-dimensional model showing a surface of constant bottleneck heat transfer characteristic values or shortcut heat transfer characteristic values;
- Coloring of lines that follow heat or air flow in a simulation, colored according to scalar fields of the bottleneck heat transfer characteristic values or shortcut heat transfer characteristic values that they pass through; and
- Colored plots on the image of a structure's surfaces indicating the variation of the bottleneck heat transfer characteristic values or shortcut heat transfer characteristic values on those surfaces.

Figures 6A, 6B, 7:
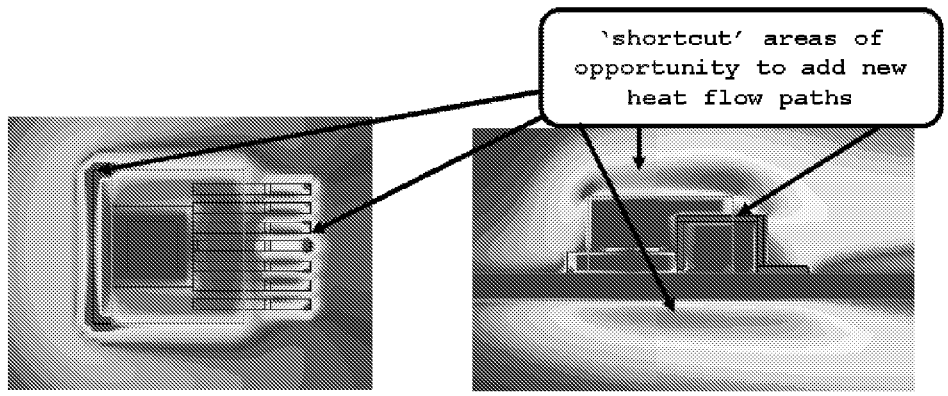
FIGS. 6A and 6B illustrate a graph of shortcut heat transfer characteristic values for the circuit device shown in FIGS. 4A and 4B that may be provided according to various embodiments of the invention.
FIG. 7 illustrates the use of a table to display heat transfer characteristic values for a circuit device in according with various embodiments of the invention.

Alternately or additionally, various implementations of the invention may show heat transfer characteristic values in a table. For example, FIG. 7 illustrates a table listing bottle neck heat transfer characteristic values (represented by the abbreviation Bn) for a plurality of locations in a structure.

Next, in operation 315, the structure may be modified based upon the heat transfer characteristic values. With some implementations, the modifications may be made manually by a user viewing a rendering of the heat transfer characteristic values. As will be appreciated by those of ordinary skill in the art based upon the foregoing description, a visual inspection of the variation of the bottleneck heat transfer characteristic values would allow determination of where a structure (e.g., a design of an electronic device) should be modified so as to result in a decrease of temperatures within the structure. More particularly, the portions of the structure with the highest bottleneck heat transfer characteristic are the locations where changes should be made to the structure if temperatures within the design are to be reduced. As a result, in operation 315 changes may be made to the structure that will reduce resistance to heat flow in that portions of the structure with the relatively higher bottleneck heat transfer characteristic values.

For example, FIGS. 4A and 4B illustrate images representing temperature values for a top and a side view, respectively, of a circuit device surface mounted on, e.g., a printed circuit board. More particularly, redder colors (yellow and red) correspond to higher temperature values, while bluer colors (blue and green) correspond to lower temperature values. As will be appreciate from these figures, a temperature distribution image indicates that the circuit device surface and corresponding regions of the printed circuit board have very high temperatures, but these images provide a designer with little or no information on how these high temperatures can be reduced. FIGS. 5A and 5B then illustrate images representing the bottleneck heat transfer characteristic values for the top and side, respectively, of the circuit device and corresponding regions of the printed circuit board printed circuit board. As noted above, the higher (i.e., more red) bottleneck heat transfer characteristics values indicate locations where changes should be made to the structure (e.g., a reduction in heat resistance) to reduce temperatures within the device. Thus, FIGS. 5A and 5B indicate that, for example, if the lead of the circuit device can be modified to have less resistance to heat flow, then this change will reduce the operating temperature of the circuit device.

The shortcut heat transfer characteristic values can be manually inspected from a rendering of these values in the same way. Regions of a structure with higher shortcut heat transfer characteristic values will indicate where the structure can be modified to add new heat flow paths (as opposed to regions of a structure with relatively high bottleneck heat transfer characteristic values, which indicate where existing heat flow paths should be enhanced by reducing the thermal resistance along those paths as previously noted). The shortcut heat transfer characteristic values indicates where the design should be altered so at to capitalize on the opportunity by adding a new heat flow path through the regions of the structure with relatively high shortcut heat transfer characteristic values that the heat flow can follow. For example, FIGS. 6A and 6B illustrate images representing the shortcut heat transfer characteristics values for the top and side, respectively, of the circuit device and corresponding regions of the printed circuit board show in FIGS. 4A-5B. As noted above, the higher (i.e., more red) shortcut heat transfer characteristics values indicate locations where the structure can be modified to add new heat flow paths to reduce temperatures within the device. Thus, FIGS. 6A and 6B indicate that, for example, if a heat sink is provided on the top of the circuit device and/or along the bottom of the printed circuit board opposite the circuit device, then these changes will reduce the operating temperature of the circuit device.

Also, while a designer may manually make changes to a design based upon heat transfer characteristic values, various embodiments of the invention may alternately or additionally work with or incorporate a tool for automatically making changes to a structure based upon heat transfer characteristic values, such as the device information modification tool 213. This type of tool may use, e.g., heuristics or other conventional design techniques to automatically make changes to a virtual structure in response to the transfer characteristic values provided by the transfer characteristic value determination module 207, the transfer characteristic value processing module 209, or both.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic or mechanical computer-aided engineering (CAE) design processes, it should be appreciated that various examples of the invention may be implemented using any desired combination of electronic or mechanical design processes.

What is claimed is:

1. A method of analyzing heat transfer in a portion of a device, comprising
   determining a heat flux vector for the portion of the device;
   determining a temperature gradient vector for the portion of the device;
   determining a heat transfer characteristic value for the portion of the device by obtaining a product of the heat flux vector with the temperature gradient vector; and
   displaying or storing the heat transfer characteristic value.

2. The method recited in claim 1, further comprising
   determining a bottleneck heat transfer characteristic value for the portion of the device by obtaining an absolute value of the dot product of the heat flux vector with the temperature gradient vector; and
   displaying or storing the bottleneck heat transfer characteristic value.

3. The method recited in claim 1 further comprising
   determining a shortcut heat transfer characteristic value for the portion of the device by obtaining magnitude of a cross product of the heat flux vector with the temperature gradient vector; and
   displaying or storing the shortcut heat transfer characteristic scalar value.

4. The method recited in claim 1, further comprising normalizing the heat transfer characteristic value.

5. The method recited in claim 1, further comprising determining a bottleneck heat transfer characteristic value for the portion of the device by obtaining a dot product of the heat flux vector with the temperature gradient vector.

6. The method recited in claim 5, further comprising displaying or storing the bottleneck heat transfer characteristic value.

7. The method recited in claim 1, further comprising determining a shortcut heat transfer characteristic value for the portion of the device by obtaining a cross product of the heat flux vector with the temperature gradient vector.

8. The method recited in claim 7, further comprising displaying or storing the shortcut heat transfer characteristic value.

9. A heat transfer analysis tool, comprising:
   a heat flux vector determination module configured to determine a heat flux vector for a portion of a device;
   a temperature gradient vector determination module configured to determine a temperature gradient vector for the portion of the heat device; and
   a heat transfer characteristic value determination module configured to determine a heat transfer characteristic value for the portion of the heat device by obtaining a product of the heat flux vector with the temperature gradient vector.

10. The heat transfer analysis tool recited in claim 9, further comprising a display for displaying an image corresponding to one or more heat transfer characteristic values determined by the heat transfer characteristic value determination value module.

11. The heat transfer analysis tool recited in claim 9, further comprising a printer for printing an image corresponding to one or more heat transfer characteristic values determined by the heat transfer characteristic value determination module.

12. The heat transfer analysis tool recited in claim 9, wherein the heat transfer characteristic value determination module is configured to determine a bottleneck heat transfer characteristic value for the portion of the device by obtaining a dot product of the heat flux vector with the temperature gradient vector.

13. The heat transfer analysis tool recited in claim 12, wherein the heat transfer characteristic value determination module is configured to determine a bottleneck heat transfer characteristic value for the portion of the device by further obtaining an absolute value of the dot product of the heat flux vector with the temperature gradient vector.

14. The heat transfer analysis tool recited in claim 9, wherein the heat transfer characteristic value determination module is configured to determine a bottleneck heat transfer characteristic value for the portion of the device by obtaining a dot product of the heat flux vector with the temperature gradient vector.

15. The heat transfer analysis tool recited in claim 14, wherein the heat transfer characteristic value determination module is configured to determine a bottleneck heat transfer characteristic scalar for the portion of the device by obtaining an absolute value of the dot product of the heat flux vector with the temperature gradient vector.

16. A method of analyzing heat transfer in a plurality of portions of a structure, comprising
   determining respective heat flux vectors for the plurality of portions of the structure;
   determining respective temperature gradient vectors for the plurality of portions of the structure;
   determining respective heat transfer characteristic values for the plurality of portions of the structure by obtaining a product of the respective heat flux vectors with the respective temperature gradient vectors for the portions; and displaying or storing the heat transfer characteristic values.

17. The method recited in claim 16, further comprising:
generating a heat transfer characteristic image of at least a part of the structure containing at least some of the portions; and
displaying the heat characteristic image on a display, or storing the heat transfer characteristic image.

18. The method recited in claim 16, further comprising altering the structure in at least some of those portions of the structure with a relatively high heat transfer characteristic value so as to increase heat flow in those portions.

19. The method recited in claim 16, further comprising
determining a respective bottleneck heat transfer characteristic value for one of the portions of the structure by obtaining a dot product of the respective heat flux vector with the respective temperature gradient vector; and
displaying or storing the respective bottleneck heat transfer characteristic value.

20. The method recited in claim 16, further comprising
determining a respective shortcut heat transfer characteristic value for one of the portions of the structure by obtaining magnitude of a cross product of the respective heat flux vector with the respective temperature gradient vector; and
displaying or storing the respective shortcut heat transfer characteristic value.

21. The method recited in claim 16, further comprising normalizing the respective heat transfer characteristic values.

22. The method recited in claim 16, wherein one type of the heat transfer characteristic is a bottleneck heat transfer characteristic value determined for the portions of the structure by obtaining a dot product of the respective heat flux vector with the respective temperature gradient vector.

23. The method recited in claim 22, further comprising displaying or storing the bottleneck heat transfer characteristic value.

24. The method recited in claim 22, further comprising altering the structure in at least some of those portions of the structure with a relatively high bottleneck heat transfer characteristic so as to reduce resistance to heat flow in those portions.

25. The method recited in claim 16, wherein one type of the heat transfer characteristic is a shortcut heat transfer characteristic value determined for the portions of the structure by obtaining a cross product of the respective heat flux vector with the respective temperature gradient vector.

26. The method recited in claim 25, further comprising displaying or storing the shortcut heat transfer characteristic value.

27. The method recited in claim 25, further comprising altering the structure in at least some of those portions with a relatively high shortcut heat transfer characteristic value so as to add one or more heat flow paths.

* * * * *